United States Patent [19]

Burstein et al.

[11] 4,164,175
[45] Aug. 14, 1979

[54] BROILERS AND ELECTRIC HEATERS THEREFOR

[75] Inventors: Norman Burstein, Cherry Hill; Richard C. Ditzler, Glendora, both of N.J.

[73] Assignee: Ultra-Heat Corporation, Cinnaminson, N.J.

[21] Appl. No.: 856,606

[22] Filed: Dec. 1, 1977

[51] Int. Cl.² .................... A47J 27/00; H05B 3/30
[52] U.S. Cl. ........................................ 99/446; 99/447; 219/457; 219/460; 219/461
[58] Field of Search ................. 99/446, 447; 219/345, 219/347, 443, 455, 457, 460, 461, 465, 467, 530, 540, 544

[56] References Cited

U.S. PATENT DOCUMENTS

| 1,472,201 | 10/1923 | Woodson | 219/461 |
| 2,250,029 | 7/1941 | Moon et al. | 99/447 X |
| 3,286,082 | 11/1966 | Norton | 219/457 X |
| 3,463,139 | 8/1969 | Hayashi et al. | 99/446 X |
| 3,646,878 | 3/1972 | Keller | 99/446 X |
| 3,738,256 | 6/1973 | Joeckel | 99/446 X |
| 3,745,912 | 7/1973 | Field | 99/446 |
| 3,789,748 | 2/1974 | Rappoport et al. | 99/446 X |

FOREIGN PATENT DOCUMENTS

| 245615 | 11/1946 | Switzerland | 219/457 |
| 238024 | 8/1925 | United Kingdom | 219/345 |

Primary Examiner—Harvey C. Hornsby
Assistant Examiner—John M. Jillions
Attorney, Agent, or Firm—Morton C. Jacobs

[57] ABSTRACT

An electric broiler suitable for the charcoal style of broiling employs large surface heater blocks using relatively small high-resistance heater elements fully encased within the heater block, which is formed of cast iron or steel. Each heater element is assembled in an iron tube, which, in turn, is clamped between and embedded within two plates forming the heater block to insure a high degree of direct contact for efficient heat transfer.

18 Claims, 3 Drawing Figures

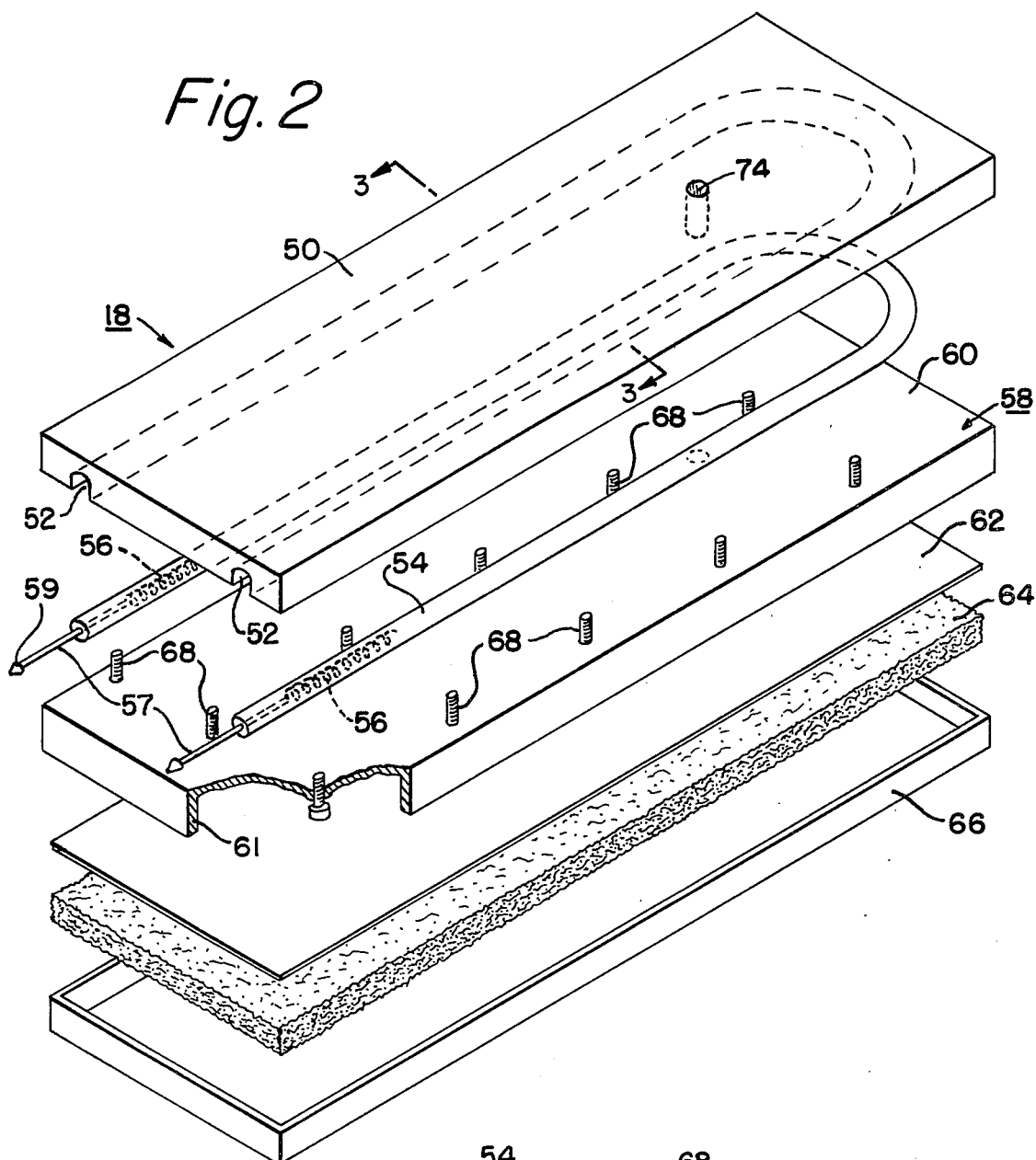

BROILERS AND ELECTRIC HEATERS THEREFOR

BACKGROUND OF THE INVENTION

This invention relates to electric broilers and particularly to broilers which produce the broiling effects associated with charcoal cooking and to electric heaters especially adapted therefor.

Charcoal broiling is a popular form of cookery commonly identified by the flaring produced when the melting fats are ignited, by the charred appearance of the fats such as on the edge of a beef steak, and by the flavors associated therewith. Gas ovens have also been employed to achieve a similar effect. In electric broilers, hairpin heaters have been commonly used to provide the heating source for broiling; an assemblage of such heater units has been used as the cooking surface or grate. These heaters employ metallic tubes (e.g., steel) with high resistance wire coiled therein for the heating source. Customarily, such broilers operate at about 750° F. and use slightly less than 1,000 watts per unit. Such broilers have been found to be undesirable in the cooked product in that meats are burned; i.e., the direct contact with the high temperature heating surface produces a heavy carmelization and a bitter taste associated therewith. Moreover, such heaters, though operating within the standard rating for such heaters tend to deteriorate rapidly because of the contaminants produced by the melted fats at the relatively high temperatures. Another form of electric broiler employs units built with hairpin heaters mounted under and in contact with iron plates, which are heated to relatively high temperatures, e.g., 1000° F., to broil the meats placed on the grates. Though the heaters are clamped in contact with the iron plates, they must still be operated at very high temperatures (e.g., 1200° to 1500° F.). They consume the order of 3000 watts of electrical energy. At those high temperatures, the hairpin heaters are operating above their standard rating and in addition are subjected to grease spattered beneath the plates. As a consequence, it is found that such heaters deteriorate rapidly in a matter of weeks or months.

High energy electric heaters also have other applications in industrial heating.

SUMMARY OF THE INVENTION

In accordance with one embodiment of this invention, an electric broiler is constructed with a plurality of heating units over which is mounted a grate, and under which is mounted a plate for reflecting upward the radiant energy from the heater units. Under the reflection plate, a drip pan collects melting fats that tend to form and pass along the grate (which is preferably inclined) into a fat trough and down into the drip pan; the latter is easily removed and emptied.

The heater units are each constructed employing hairpin heaters that are assembled in a metallic block having both good thermal conductivity and retentivity; a suitable metal is that of cast iron or steel. These blocks are operated at a temperature of about 1200° F. or higher, which is effective for the broiling cooking in that melting fats dropping on the heater blocks flare up and produce the charring of fat on the cooked meat which is a desirable feature. In addition, the grate on which the meats lie is at a lower temperature and is effective to produce searing of the meat; that is, a light carmelization without the bitter taste of burned meat. The heaters themselves operate at a temperature not much above that of the block and have been found able to operate at a power level much greater than (almost twice) the rated wattage, for the solid iron block is effective to draw off the heat by direct contact with and by completely surrounding the heater tubes.

Accordingly, it is an object of this invention to provide a new and improved electric broiler;

Another object is to provide a new and improved electric broiler which is effective for charcoal-type of cookery.

Another object is to provide a new and improved electric broiler which is economical to operate;

Another object is to provide a new and improved electric broiler in which the electric heaters last for a substantial time period;

Another object is to provide a new and improved heater unit;

Another object is to provide a new and improved heater unit having long life and high reliability.

BRIEF DESCRIPTION OF THE DRAWINGS

The foregoing and other objects of this invention, the various features thereof as well as the invention itself may be more fully understood from the following description when read together with the accompanying drawings, in which:

FIG. 2 is an exploded perspective view of a heater unit embodying this invention and used in the broiler of FIG. 1, and FIG. 3 is a sectional view along an intermediate line 3—3 of the heater unit of FIG. 2, but illustrated in assembled form.

In the drawing, corresponding parts are referenced throughout by similar numerals.

DETAILED DESCRIPTION OF A PREFERRED EMBODIMENT

Figure 1:
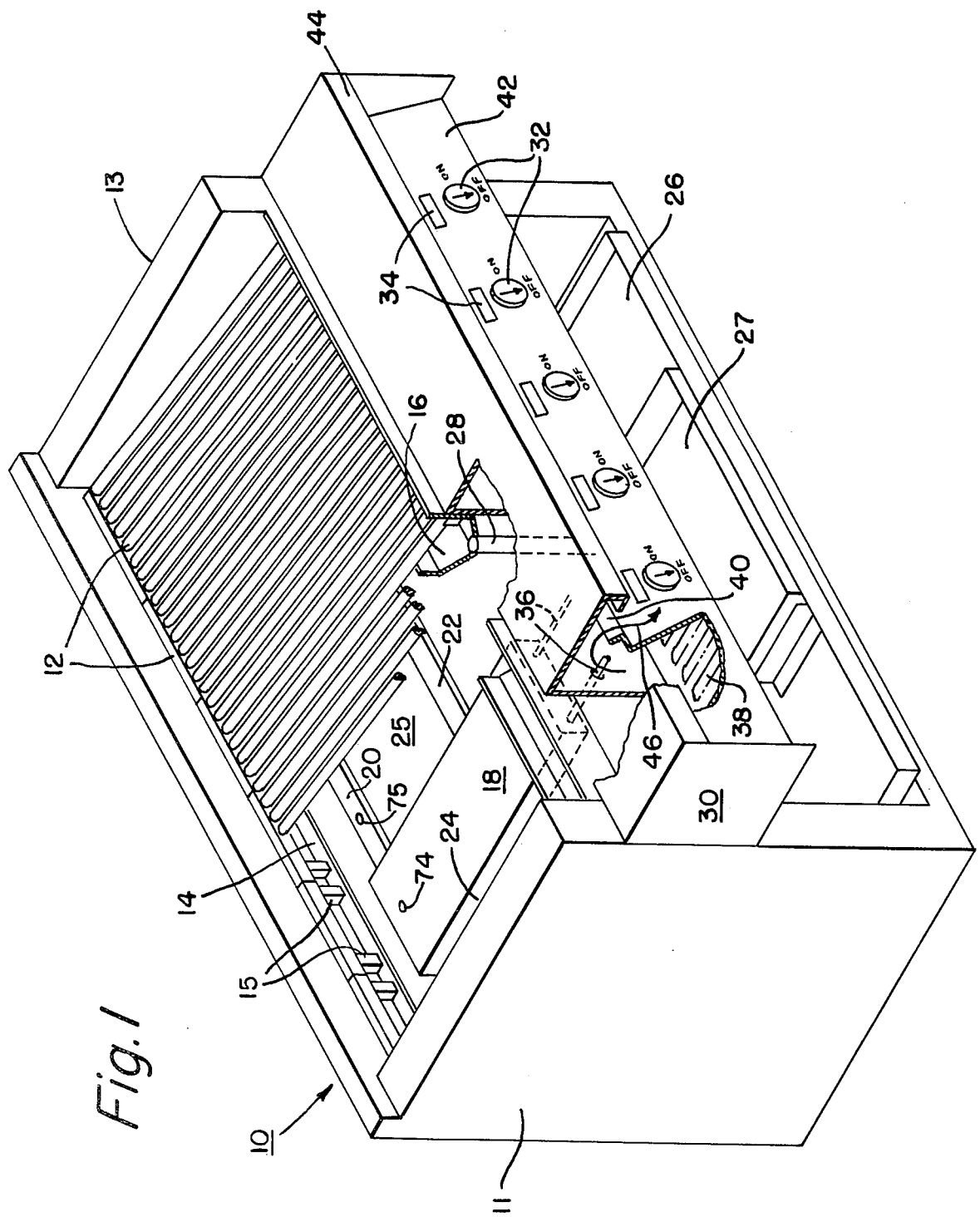
FIG. 1 is a perspective view with parts omitted and parts broken away of a broiler embodying this invention.

A broiler embodying this invention (FIG. 1) includes a housing 10 formed of sheet metal and closed at the back and bottom and at the side walls 11 and 13, which may be suitably insulated. The housing 10 is partially open in the front and fully opened on the top to expose a series of grate or grill units 12 for broiling. The rear legs 15 of the grates project downward and rest on a ledge 14 secured to the rear wall of the broiler housing 10, and the front ends of the grates rest on a trough 16 that is effective for collecting melted fats that run down the inclined parallel bars of the grates 12 during the broil operation. The grates 12 may also be inverted with the legs projecting upward and the grate bars substantially horizontal.

Underneath the removable grates 12, a series of heater blocks 18 are assembled along the length of the housing from one side 11 to the other 13. These heater blocks 18 are generally rectangular (and constructed as shown in detail in FIGS. 2 and 3 and described below). The heater blocks 18 are supported by two support bars 20 and 22 that extend the full width of the housing from one side wall 11 to the other 13. In one embodiment of this invention, six such heater blocks 18 are mounted on and bolted to the support bars 20, 22. Between each pair of adjacent heaters 18, a space 24 is provided for circulation of heated air and to pass dripping grease. Beneath the heater blocks 18 and spaced therefrom, a reflector plate 25 is mounted extending generally from one side of the housing to the other and from the front to the rear. This reflector plate, a shiny stainless steel surface, is supported on ledges (not shown) welded to the inner walls of the housing, so that it may be removed for cleaning, and it has spaced slots vertically aligned with spaces 24 for air circulation and passage of grease to avoid accumulation near the heaters. Beneath the reflector plate is a grease pan 26 that extends generally over the entire bottom of the broiler to catch falling grease, and in the pan 26, a removable grease receptacle 27 is positioned under spout 28 to collect the melted grease that flows into the trough 16 and through the collection spout 28 into the grease pan 26. The latter pan 26 and receptacle 27 can be readily removed for emptying and cleaning.

A control panel unit 30 in the front of the housing has front control knobs 32, one for each heater block 18 for switching on electrical power to the heater blocks, and also for controlling their energization. Indicator lights 34 are off when the control switches 32 are "off", and are lighted to indicate that power is being supplied to the heater block.

A suitable form of control is one that supplies electricity for a short period, turns off for a short period and then turns back on again. The duty cycle is controlled by adjustment of the switch knobs 32, which thereby control the average energization of the heater over a cooking or other heating period. With these controls the heater blocks can be kept at a moderate temperature for low production, and heated up reasonably quickly to higher temperature for high cooking or other production.

The terminals 36 of each heater block extend into the control housing 30 for electrical connections to the switches 32 and to the power supply connections (not shown). Louvers 38 in the bottom of the rectangular control housing 30, permit air to rise upward through that control housing and out through the space 40 formed between the inclined front face 42 of the control panel and the overhanging top wall 44 of the control-panel housing 30. Thus the air circulation through space 40 indicated by arrow 46 is effective to maintain the electrical connections in a suitably cool temperature.

The heater blocks 18 (FIGS. 2 and 3) each include a base plate 50, with a U-shaped groove 52 formed in the under-surface thereof and having spaced openings from the front thereof. A U-shaped heater unit 54 fits tightly within the groove 52 and has terminals 36 that project from the front end thereof. This heater unit 54 includes a steel tubular sheath with a high-resistance coiled heater wire 56 extending therethrough and spaced from the sheath wall by suitable electrical insulation, in a manner well know in the art. The ends of the sheath 54 extend beyond the edge of plate 50 into the control housing 30 (FIG. 1). Quick-disconnect electrical terminals 36 are connected thereat (FIG. 1) to terminals 59 of the heater wire connectors 57 (FIG. 2) and extend to the switches 32 (FIG. 1). The plate 50 is fabricated of hot-rolled steel (e.g., about a half-inch thick) and the groove 52 is milled therein (e.g., about a quarter-inch deep), or, preferably, is fabricated of cast iron formed in the desired grooved shape. Beneath the heater base plate 50 is a clamping pan 58, which has a top flat plate 60 and side walls 61 forming a hollow interior, into which is mounted a stainless steel reflecting sheet 62, a sheet of insulation 64 (e.g., a half-inch pad of cecor-felt), and a pan-shaped member 66 which is press fitted into the clamping pan 58 to retain the reflector and insulation in place.

The heater element 54 is tightly held in the groove 52 by the flat top plate 60 of the steel clamping pan 58. The groove 52 is somewhat smaller in depth than the diameter of the iron tube 54 of the heater element so that the compression action of pan 58 under the pressure of a large number of bolts 68, is effective to deform slightly the steel heater sheath tube 54 to insure that the latter fits fully and closely into the groove 52 and also makes good contact with the clamping surface 60. This deformation 70 of the heater sheath 54 by clamping pan 58 is shown in somewhat exaggerated form in the cross-sectional diagram of FIG. 3. In order to achieve the extremely close contact that produces the most effective operational conditions, the bolts 68 are provided on each side of the two sections of the horseshoe groove 52 (three bolts in a line as shown in FIG. 3), and a substantial number of these bolts extend down along the U-shaped heater sheath 54 to provide the necessary clamping action along the entire length thereof. The bottom part of closure pan 66 is welded in place at edges 72. A bolt hole 74 through the base plate 50 and the other parts of the block 18 is used for attaching each block 18 to an aligned bolt hole 75 in the broiler support bar 20.

With this heater unit, the top base plate 50 may be heated up at 1200° F. or higher to 1500° F. so that it is a glowing red heater bed like red charcoal. The heating is effective only on the upper surface of the base plate 50, the groove walls of which enclose most of the sheath 54. The clamping pan 58 underneath does not receive much direct heat transfer from sheath 54 and does not get hot to the high operational temperature needed for the charbroiling effect. By reason of the space 63 between the stainless steel reflecting sheet 62 and the undersurface of the clamping pan 58 (a space 63 that effectively corresponds to the heads of the threaded bolts 68) an insulating air layer is provided, which together with the reflecting sheet 62, and insulation batt 64 insures that the closure pan 66 at the bottom thereof is not heated to these extreme temperatures. Thus, there is extremely good heat transfer from the deformed heater sheath 54 to the upper base plate 50 and a substantial temperature differential exists therebelow. The heater block efficiently supplies a high level of heat upwards only—acting as a unidirectional heat source. The heater elements 54 can be operated at a very high level (e.g., 2300 watts input) and the large heat output is effectively transferred to the large area of base plate 50 from which it can be readily dissipated in the broiling operation.

The heater blocks 18 all normally operate at greater than 900° F. at the base plate 50. Thus, the entire area of each plate 50 glows red, and the area over the series of heater blocks 18 serve like a bed of glowing charcoals (except for the space 24 between blocks to pass the melting fat). That entire heating area ignites the dripping fat to produce the flaring associated with charcoal broiling. This large flaming area corresponding to an open hearth broiler is achieved with the relatively small heater elements 54, the high heat output from which is spread out efficiently. The effective area of the heater blocks 50 is not limited to the illustrative 4 by 20 inch base plate 50. Larger base plates may be used, and depending on the area two hairpin heaters may be embedded in each block, or an M-shaped heater element may be used.

The heater block 50 is preferably cast of gray iron with a high silica content to ensure uniform expansion and contraction. The block 50, though subjected to high temperature heating (e.g., 1200°-1500° F.) is not adversely affected by the food acids and cooking aerosols nor by the flaring of burning fats. Thus, the heater blocks serve like a glowing charcoal bed for broiling, but with the small heater sheaths 54 and their encased wires 56 are fully isolated from any contamination and resulting deterioration and particularly from the hightly destructive effects of contact with the melting fats. Moreover, the sheaths and heater wires do not overheat (due to the efficient heat transfer to add dissipation in blocks 50). The heater wires 56 and their sheaths 54 (fabricated, for example, of a high nickel content alloy such as Incalloy) operate at the same high temperatures as the surrounding base plates 50 and do not burn out due to deteriorating effects, but have a suitably long operating life, which is substantially that of the rated life for such heaters. The heater elements may be operated with a higher input wattage than suitable for them when they are operated so as to be exposed directly to the cooking ambient. However, with the heater elements embedded in the ferrous blocks, the heat output is spread efficiently over the larger block surface and the contaminants of the cooking ambient do not reach the heater elements.

In assembling the hairpin heaters 54 in the grooves 52, a press is used to apply the clamping action needed to force the sheaths into the grooves 52. The sheaths are sufficiently soft due to annealing to flow and to be distorted to the shape of the grooves for the direct contact over the entire sheath surface needed for efficient heat transfer. The clamping plate 58 is tightly bolted to base plate 50 to hold the heater in place during the extreme conditions of operation. The nichrome resistance wire 56, the ultimate heat source is spaced from the sheath 54 by a dielectric cement, which is a good heat conductor, so that good conduction is achieved throughout to spread out the heat over the surface of heater block 50.

The broiler of FIG. 1 is illustrated as containing six heater blocks 18 (the heating area of each being, for example, about 4 by 20 inches) mounted in a row between the side walls 11 and 13; larger or smaller numbers of blocks may be used. The heater blocks may be mounted above the grates and facing down for heating from above, or heaters may be mounted both above and below the grate for simultaneous heating on both sides of the food or other work. In addition these heater blocks may be employed with movable conveyor-type grates, and a plurality of heater units both above and below the grate; a suitable conveyor broiler in which these heater units may be used above and below the conveyor grate is described in the N. Burstein Patent U.S. Pat. No. 3,448,678, which is incorporated by reference. The heater units may be used for various types of cooking of food, and for heating various types of materials in a variety of process heating applications.

Accordingly, a new and improved electric heater unit is provided which is effective for high temperature heating such as that associated with charcoal broiling and without the deteriorating effects on the electric heater elements associated with such heating. An electric broiler using such heater units is effective to operate similarly to a charcoal broiler, and with the convenience and versatility of an electric broiler. Various modifications of this invention will be apparent to those skilled in the art from the above description of an embodiment of the invention, which is presented by way of illustration and not as a limitation on the scope of the invention which is set forth in the following claims.

For example, it is desirable to form both the clamping plate pan 58 and the base plate 50 out of the same material (preferably cast iron) to avoid warping due to the extreme expansion and contraction (and differences thereof for different materials) with the high temperature variations in use.

What is claimed is:

1. An electric cooker for flare broiling of meats containing fats, said cooker comprising a housing, a grate mounted within said housing for supporting meats to be broiled; a high temperature heater block mounted under said grate; and means for energizing said heater block;
   said heater block including:
   a plurality of ferrous bodies having mating clamping faces, said face of one of the bodies having a small groove therein,
   and a heater element including a ferrous sheath and a high resistance heater wire in said sheath, said sheath having linear and cross-sectional shapes substantially similar to corresponding shapes of said groove,
   said one body having a large outer surface extending under said grate to receive melted fats dripping from the broiling meat,
   and said heater element sheath being mounted in said groove and the high temperature portions thereof clamped between said bodies to be fully enclosed thereby and isolated from contamination by dripping fats and so that heat developed in said heater element is transferred over the large outer surface of said one body;
   and said heater block energizing means including means for electrically energizing said heater wire to operate said outer surface of the heater block at a temperature above 1200° F., so that dripping fats falling on said outer surface flare up and, in the burning thereof, contribute heat to the broiling of the meat,
   whereby said cooker tends to be energy efficient and to avoid deterioration of said heater element by contaminants in the cooking environment.

2. An electric cooker as recited in claim 1 and comprising a plurality of said heater blocks spaced to pass dripping of melting fats therebetween.

3. An electric cooker as recited in claim 2 wherein said grate is stationary.

4. An electric cooker as recited in claim 2 wherein said grate is movable.

5. An electric cooker as recited in claim 2 and further comprising an additional plurality of said heater blocks mounted above said grate.

6. An electric cooker as recited in claim 5 wherein said grate is a conveyor for food to be cooked.

7. An electric cooker as recited in claim 1 and further comprising a grease pan below said heater block to receive dripping fats; said heater block including means for maintaining said heater block as a unidirectional high-temperature heat source so that a substantially lower temperature is produced below said heater block and at said grease pan.

8. A high temperature heater block as recited in claim 7 wherein the other of said bodies has a planar clamping face for clamping said ferrous sheath entirely in said grooved body.

9. A high temperature heater block as recited in claim 8 wherein said groove has a cross-sectional dimension smaller than the corresponding dimension of said sheath, and said sheath is compressed to be in close contact over its periphery and length in said groove.

10. A high temperature heater block as recited in claim 9 wherein said sheath is deformed in cross-sectional shape by the clamping action for close contact over its periphery with said groove.

11. A high temperature heater block as recited in claim 10 wherein said other body is secured to said one body with said sheath clamped between by pluralities of bolts along each side of said groove.

12. A high temperature heater block as recited in claim 8 wherein said other body includes insulating means below said clamping face thereof to limit flow of heat therebelow.

13. A high temperature heater block as recited in claim 12 wherein said other body includes reflector means below said clamping face to reflect radiant energy towards said one body.

14. A high temperature heater block as recited in claim 8 wherein said other body includes a plate having a reflecting surface on one side spaced from the wall of said planar clamping face, a body of insulating material on the other side of said reflecting plate, and a closure plate for retaining said insulating body within said other body.

15. An electric cooker as recited in claim 1 wherein said housing includes a main section for mounting said heater block and grate, and a control panel section adjacent to and projecting out from said main section and having an inclined face member, a louvered projecting member, and an overhanging work surface member projecting as a cantilever over said inclined member and spaced therefrom to permit circulation of air upwards through the louvers of said projecting member and outward through the space under said work surface, whereby said control panel is air-cooled and maintained substantially cooler than said main housing section during high temperature cooking operation.

16. An electric cooker as recited in claim 15 and further comprising electric control elements mounted on said inclined face member for manual operation thereof, and electric connections between said heater block and said control elements and passing over said louvered projecting member and air-cooled by air passing therethrough.

17. A high temperature heater block comprising:
a plurality of ferrous bodies having mating clamping faces, one of said bodies being thick and having a groove in the clamping face thereof,
a heater element including a ferrous sheath and a high resistance heater wire in said sheath, said sheath having linear and cross-sectional shapes substantially similar to corresponding shapes of said groove,
said heater element sheath being mounted in said groove and clamped between said bodies to be fully enclosed thereby,
the other of said bodies being pan-shaped with thin walls and having a planar face on the clamping wall for clamping said ferrous sheath entirely in said grooved body;
said groove having a cross-sectional dimension smaller than the corresponding dimension of said sheath, and said sheath being compressed in cross-sectional shape to be in close contact over its periphery and length in said groove,
and means enclosed within the side walls of said pan-shaped body for maintaining a substantially lower temperature thereat, said maintaining means including a plate having a reflector surface adjacent to and spaced from said clamping wall and extending between said side walls, and a body of insulating material within and extending between said side walls.

18. A high temperature heater block as recited in claim 17 wherein said pan-shaped body is secured to said grooved body with said sheath clamped between by pluralities of headed bolts along each side of said groove, said reflector plate is spaced from said clamping wall by the heads of said bolts, and a closure plate extending between said side walls and retaining said body of insulating material against said reflector plate.

* * * * *